United States Patent [19]
Gregory et al.

[11] Patent Number: 5,095,748
[45] Date of Patent: Mar. 17, 1992

[54] SONIC TANK MONITORING SYSTEM

[75] Inventors: Edward M. Gregory, Garland; Thomas B. Williams, Denton, both of Tex.

[73] Assignee: Tidel Engineering, Inc., Carrollton, Tex.

[21] Appl. No.: 562,817

[22] Filed: Aug. 6, 1990

[51] Int. Cl.[5] .................... G01F 23/28; G06G 7/78
[52] U.S. Cl. .................... 73/290 V; 73/291; 364/509
[58] Field of Search .............. 73/290 V, 291, 628; 364/509

[56] References Cited

U.S. PATENT DOCUMENTS

| | | | |
|---|---|---|---|
| 4,159,646 | 7/1979 | Paulsen et al. | 73/290 V |
| 4,510,804 | 4/1985 | Byatt et al. | 73/290 V |
| 4,748,846 | 6/1988 | Haynes | 73/290 V |
| 4,815,323 | 3/1989 | Ellinger et al. | 364/509 X |

Primary Examiner—Daniel M. Yasich
Attorney, Agent, or Firm—Jack A. Kanz

[57] ABSTRACT

The height of a liquid level from the bottom of a storage tank or the like is accurately determined by using a probe with dual isolated channels to measure the time for an acoustic signal to travel between fixed submerged points and from a transducer in one of the channels to the surface of the liquid. Elapsed time measurements are converted to liquid volume using predetermined velocity-temperature values to compensate for temperature variations in the tank.

17 Claims, 1 Drawing Sheet

SONIC TANK MONITORING SYSTEM

FIELD OF THE INVENTION

This invention relates to methods and apparatus for monitoring the volume of liquids in storage tanks and the like. More particularly, it relates to methods and apparatus employing a probe which measures the time required for an acoustic signal to travel from a known reference point to the surface of a liquid to determine the level of liquid in a tank and converts the liquid level to net volume at a specific temperature using predetermined conversion factors.

BACKGROUND OF THE INVENTION

Many liquids are commonly stored in tanks located underground or otherwise disposed so that the actual liquid surface level cannot be observed directly. Furthermore, environmental protection regulations require that tanks which contain certain products such as gasoline and the like be equipped with means for detecting very low leak rates.

While estimates of liquid level in a tank can, in most cases, be made with a calibrated dip stick or the like, this method is neither accurate nor reliable. Furthermore, it provides no means to compensate for volumetric changes resulting from temperature changes.

More sophisticated instruments have been developed which measure the time required for an acoustic signal to travel from a transducer located at a known location in the tank to the surface of the liquid and return to the transducer by reflection from the surface. As with a calibrated dip stick, the gross volume of liquid can be determined from the measured liquid level if the geometry of the tank is known. However, the velocity of an acoustic signal in a liquid varies with temperature of the liquid. Thus, to determine the actual height of the liquid level, the temperature of the liquid must be known. Unfortunately, the temperature of a liquid in a large storage tank is seldom constant throughout the liquid. Accordingly, in using acoustic methods to obtain accurate distance measurements in a liquid, the temperature of the liquid must be measured at various heights from the bottom of the tank and the vertical of the acoustic signal through each horizontal section of liquid compensated for temperature. This, of course, requires a plurality of temperature measuring devices at precisely known locations. Alternatively, a plurality of reflectors may be placed at fixed known locations with respect to the transducer and the time for an acoustic signal return from each such reflector measured. Thus, if the distance between reflectors is known and the temperature of the liquid between two of such reflectors is known, a temperature compensated average velocity can be calculated to determine the height of the liquid surface. However, this approach has inherent difficulties and limitations. At least one temperature measuring device must be submerged in the liquid and the average temperature calculated from various reflection time measurements. Furthermore, it becomes extremely difficult to distinguish between acoustic signals reflected from the liquid surface and acoustic signals reflected from the fixed reflectors, particularly where the reflector is near the liquid surface.

Various attempts have been made to determine net liquid volume in a tank by measuring acoustic signal velocity through the liquid. Typical of such attempts is U.S. Pat. No. 4,805,453 wherein a complicated signal detection scheme is employed in an attempt to distinguish between reflections from the liquid surface and reflections from a fixed reflector. Temperature compensation is attempted in the typical manner of using at least one submerged temperature sensor and extrapolation of temperature data from actual measurement at a fixed location.

It is well known that actual measurement of the temperature of a liquid is difficult and that temperature-sensing devices submerged in a liquid are expensive, subject to failure and frequently unreliable. Furthermore, the prior art has generally failed to recognize that the average velocity of an acoustic signal from a transducer to a reflective surface is not necessarily equal to true velocity at any point between the active surface of the transducer and the reflector because of errors introduced at the surface of the transducer. For example, cavitation may occur at the fluid/transducer interface. Velocity of the acoustic signal through any vapor or foam formed by cavitation would, of course, be different from velocity through the liquid. Any such effects occurring at the face of the transducer thus introduce errors in the measured elapsed time.

SUMMARY OF THE INVENTION

In accordance with the present invention, highly accurate liquid level measurements are made and temperature compensated without using a submerged temperature sensor, and liquid level measurements are made without possible interference by fixed reflectors. To accomplish these measurements, the invention employs a probe comprising two parallel tubes or channels positioned vertically in the tank. A transducer is secured in the extreme lower end of each tube and the extreme end of the probe positioned at a known distance from or adjacent the bottom of the tank. Reflectors are positioned at known distances from the transducer in one of the parallel tubes. The other tube contains no reflectors.

The velocity of an acoustic signal in known liquids over a range of anticipated temperatures is determined experimentally and stored in memory in a computer. The time for an acoustic signal to reflect from the liquid surface to the first transducer is measured to make a gross determination (not compensated for temperature) of liquid height. The time for an acoustic signal to reflect from each of the submerged reflectors in the second tube is then made and compared to the velocity values stored in the computer to determine the average temperature of liquid between any two submerged reflectors. The actual height of the liquid is then calculated using the temperature compensated velocity values and converted to gross volume using the known geometry of the tank. By isolating the fixed reflectors in one tube and using two separate transducers to determine reflection times from the liquid surface and the fixed reflectors, it is extremely easy to distinguish between reflections from the surface and reflections from fixed reflectors, even when the submerged fixed reflector is at or near the liquid surface. Furthermore, by using experimentally determined velocity vs. temperature measurements stored in computer memory, all need for submerged temperature sensors is eliminated and temperature compensated velocity values can be determined for the liquid between any two submerged reflectors. By using a plurality of fixed reflectors, one of which is located relatively near the transducer, velocity errors due to cavitation or the presence of a second liquid (such as water) can be easily eliminated and the liquid level of a second liquid can be readily determined. These and other features and advantages of the invention will become more readily understood from the following detailed description taken in connection with the appended claims and attached drawing in which:

DETAILED DESCRIPTION

Figure 1:
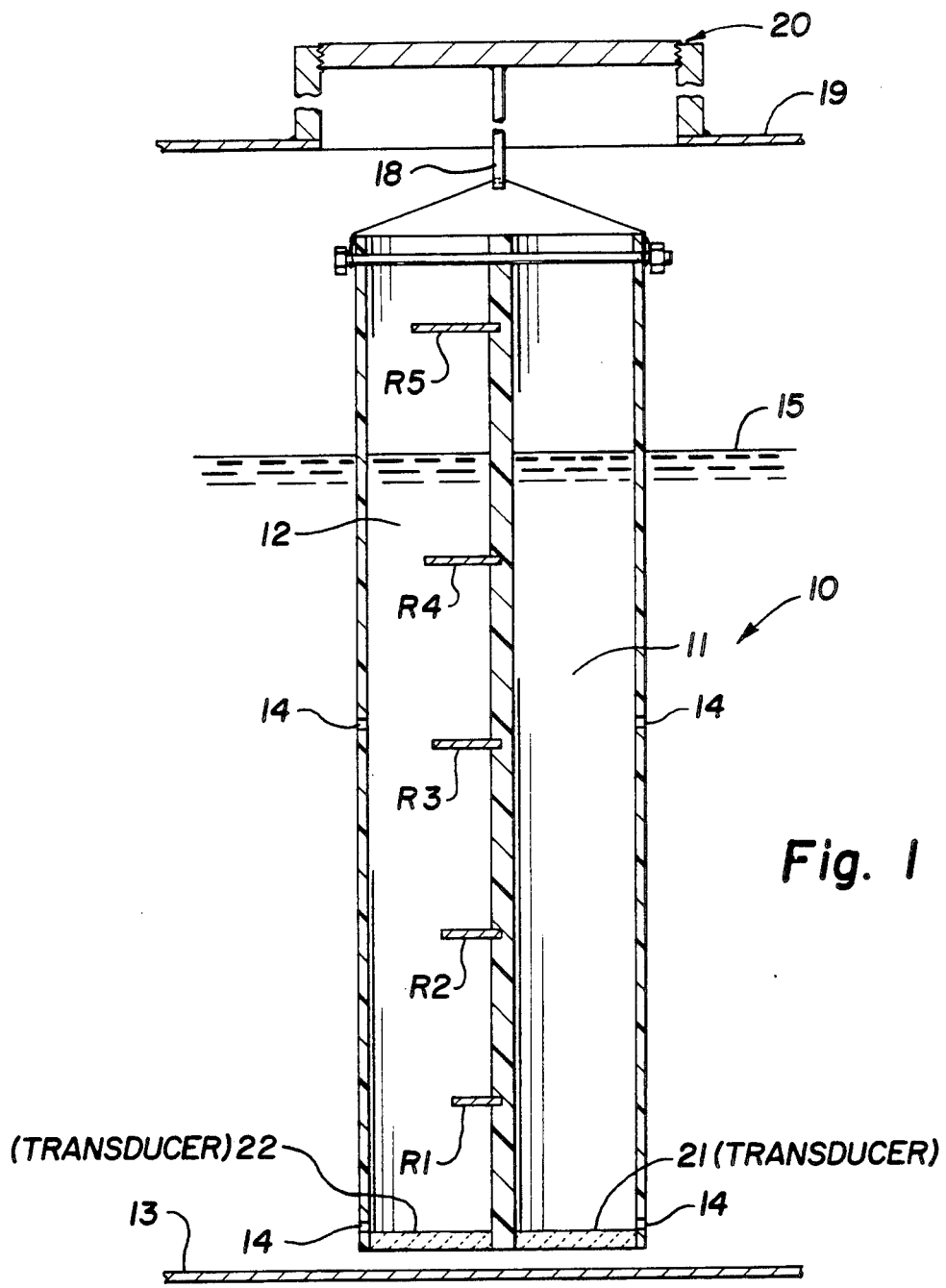
FIG. 1 is a fragmentary sectional view illustrating the preferred embodiment of the probe of the invention suspended in a tank containing a liquid.
Figure 2:
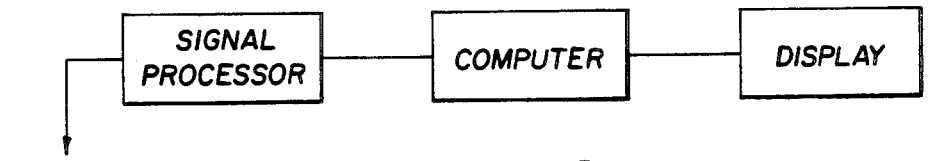
FIG. 2 is a system diagram of the apparatus of the invention.

The preferred arrangement of tank monitoring probe and its position within a tank to employ the principles of the invention are illustrated in FIG. 1. The probe 10 comprises an elongated body defining dual linearly elongated parallel cylinders 11 and 12 referred to herein as channel 1 and channel 2, respectively. The probe body may be formed as a unitary molded or extruded body or may be fabricated from a pair of tubes. The probe is preferably formed of non-metallic materials which are resistant to the environment in which it is to be used. Various plastics, fiberglass and the like are suitable. Significant criteria in selecting the material of the probe are that it be inert with respect to its operating environment and that it not act as an acoustic wave propagation device at the frequencies of the transducer used. The probe must also be relatively rigid, straight and have a low coefficient of expansion with temperature.

First acoustic transducer 21 and second acoustic transducer 22 are secured within the extreme ends of channels 1 and 2, respectively, and the probe 10 supported vertically within a tank by suitable suspension means 18 with the extreme end of the probe 10 adjacent or at a known distance from the bottom 13 of the tank.

Suspension means 18 may be any suitable mechanical means such as a bale, chain or the like which supports the probe 10 vertically within the tank and is normally secured within a necked opening 20 in the top 19 of the tank. In order to convert the collected data to volume, the exact geometry of the tank and the distance from the bottom of the tank to the active surface of the transducers 21 and 22 must, of course, be known. Furthermore, since distance measurements are made within the confines of the channels 1 and 2, means such as holes 14 in the channels must be provided so that the surface level 15 of the liquid in the tank is at all times the same as the liquid level in channels 1 and 2.

A plurality of reflectors R1-R5 is positioned within channel 2 at known distances from transducer 22. For convenience, the reflectors may be spaced at equal volumetric intervals (the distance between each reflector representing an equal portion of the total tank volume) and/or the reflectors may be made progressively larger with distance from the transducer 22. The number and location of reflectors may, of course, be varied as desired. However, since the acoustic signal sensed by the transducer is a reflection from one of the reflectors, care should be taken to avoid placing any reflector at a distance from the transducer which is a multiple of the distance between the transducer and any other reflector.

The channels are used to isolate the acoustic signals from each other and prevent echo returns from anything other than the surface of the liquid in channel 1 and the reflectors in channel 2. By isolating the acoustic signals from each other and from the remainder of the tank, signal interference from extraneous reflections is avoided. Signal degradation by dispersion within the tank is also avoided and the transducer is effectively isolated from external noise. Thus, the signal-to-noise ratio for reflected signals is greatly improved.

In the preferred embodiment, the probe 10 is a one-piece molded structure of plastic or fiberglass having parallel cylindrical channels which are approximately one inch in diameter. Transducers 21 and 22 are secured at the extreme ends of channels 1 and 2, respectively, and arranged to transmit an acoustic signal toward the surface of the liquid and sense a reflected echo. Various conventional acoustic devices are suitable. A typical transducer for use in gasoline storage tanks operates at five hundred kilohertz. The frequency selected, however, is usually determined by the fluid in which it is to be used since the characteristics of the fluid may affect the effective propagation of sound waves at different frequencies.

It should be noted that only the probe 10 which contains transducers 21, 22 and reflectors R1-R5 is positioned within the tank. The probe contains no temperature sensors and no moving parts or electronic devices other than transducers 21, 22 and electrical cables for connecting the transducers to the operating system.

The operating system, comprising a signal processor, a computer and a display, is located in a console at a convenient remote location and connected to the probe by suitable electrical cables. Obviously, the operating system console may be suitably interconnected with a plurality of probes, if desired, positioned in various storage tanks or the like and/or with other condition monitoring systems, alarms, etc.

In order for the system of the invention to accurately determine liquid volume in a tank, the geometry of the tank must be known and the equation for converting liquid height to gross volume stored in the computer. Furthermore, since the velocity of an acoustic signal through a liquid varies with temperature of the liquid, the temperature vs. velocity characteristics of the liquid must be known.

The present invention provides accurate volumetric measurement without directly determining temperature (or density) of the liquid. Instead, velocity vs. temperature measurements are made under precisely controlled laboratory conditions over a range of temperatures for each liquid in connection with which the monitoring system is to be used and the laboratory-determined velocity-temperature coefficients for each such liquid are stored in the computer memory. The computer is programmed to use these values to calculate the temperature of the liquid between the transducer and any reflector or between any two reflectors upon determination of the measured time for an acoustic signal to traverse the known distance in the liquid. Thus, the monitoring system only measures travel times of the acoustic signal between reference points positioned at known distances apart. The computer, using stored data, converts the time data to gross volume. After gross liquid volume has been determined, this value can be converted to net volume (volume of liquid at 60° F.) by using the American Petroleum Institute (API) algorithm known as TAB 6B. The TAB 6B subroutine (or any other suitable conversion factor) is also stored in the computer to convert gross volume to net volume as required.

Operation of the system only requires use of the probe to determine time for an acoustic signal to traverse known distances in the liquid. Transducer 21 is activated to emit a signal pulse and the elapsed time for the signal to travel to the surface 15 of the liquid and return to the transducer is measured. This measurement is made by conventional electronic means employing a clock which is started when the signal is transmitted and stopped when the echo is received. Time of travel is thus represented by clock counts during the time interval. In the preferred method of operation, a plurality of such measurements are performed in rapid succession and an average time computed to improve statistical accuracy. Since the temperature of the liquid is unknown, however, this measurement only determines signal travel time, not distance.

After the signal travel time to the surface of the liquid 15 is determined in channel 1, transducer 22 is pulsed to determine the signal travel time from transducer 22 to each of the reflectors in channel 2 which are submerged. Note that a reflection will also be received from the liquid surface 15 in channel 2. However, if the surface level of liquid 15 is near a reflector, it will be difficult to determine whether the last reflection is from a fixed reflector or the surface of the liquid. Thus, if the elapsed time is close to the time measured in channel 1, the last reflected signal will be disregarded and the next lower reflector recognized as the highest submerged reflector. Since the distance from transducer 22 to each of the reflectors is known, the temperature of the liquid between any two submerged reflectors can be readily calculated by the computer using the measured time and the velocity vs. the computer using the measured time and the velocity vs. temperature data stored in the computer. If more than one reflector is submerged, it is preferable to disregard the measured elapsed time from the transducer to the first reflector R1 since this value may be distorted by interface effects such as cavitation at the transducer surface and/or the presence of a second liquid such as water of sufficient volume to cover the transducer, thus forming a liquid/liquid interface between the transducer and the reflector R1. Since the actual velocity of the acoustic signal between the transducer 22 and each of the reflectors can be calculated from the measured times, and since the distances are known, the average temperature of the liquid between each of the reflectors can be determined and these temperatures used to calculate an average temperature of the liquid to the height of the highest submerged reflector. This average temperature of the entire column of liquid in channel 1 as well as channel 2. Thus, a temperature correction factor for the column of liquid can be determined. By applying the temperature correction factor as determined by the measurements in channel 2, the elapsed time measured in channel 1 can be used to accurately determine the precise level of liquid in channel 1.

Since the system measures elapsed time for a signal to travel from the transducer to the surface and return to the transducer, actual level of the surface of the liquid is determined by $$d = \frac{cv}{2f}$$

where
 d = distance from transducer to liquid surface
 v = signal velocity in the liquid
 c = clock cycles
 f = clock frequency Once the liquid level is determined, the gross volume of liquid is determined by reference to a tank table or by applying a known tank geometry factor. Net volume may then be determined by applying the TAB 6B subroutine or other suitable conversion factor.

It will be recognized that under certain conditions two immiscible liquids may be contained in the same tank. In this case, the less dense liquid will float on the more dense liquid forming a liquid/liquid interface. The velocity of an acoustic signal ill, in most cases, be different in each of the liquids.

A two liquid situation frequently occurs in storage tanks for petroleum products such as gasoline by condensation of water or introduction of other contamination. Determination of the presence and volume of such a second liquid is thus critical for making accurate net volume determinations and to making accurate leak detection determinations.

As noted above, the probe 10 is suspended in the tank with the transducers 21, 22 at or near the bottom of the tank. Since the acoustic signal is directed upwardly from the top surfaces of the transducers, any liquid level below the top surfaces of the transducers will not be detected. With the transducers as close as possible to the bottom of the tank, any liquid below the top surface of the transducer can ordinarily be disregarded as negligible. However, if the level of the second liquid is above the active surfaces of the transducers, its volume can be determined by various techniques. For example, if the volume of the lower liquid is sufficiently large, its volume can be determined as described above by treating the liquid/liquid interface as the surface of the liquid.

In ordinary use for monitoring fuel storage tanks, the gradual accumulation of water, if it occurs, will be observed before a large volume is present. Since the accumulation of water is anticipated, temperature vs. velocity information for water is also stored in the computer memory.

As noted above, if the water level is above the first fixed reflector, the level of water can be readily determined by using the reflection from the water/fuel interface as the liquid surface. However, if the water level is below the first reflector, different methods may be used to determine water level.

In a fuel storage tank, any reflection received from a level below the first reflector is first assumed to be a reflection from a water/fuel interface. The water level is readily calculated by multiplying the measured time by the velocity of sound in water. The velocity of sound in water is $$V_w = A + (B)(T)$$

where
 A = 54716.34 inches/second
 B = 54.26 inches/second °F.
 T = temperature in °F.

In using this method, the latest measured or calculated average temperature of the liquid in the tank may be taken as the current temperature of the water if current temperature cannot be determined directly.

Alternatively, a counts variation method may be used to determine the level of the second liquid where the velocity of sound is different in the two liquids. This method requires that at least two reflectors be submerged in the total liquid volume and that the level of the lower liquid is below the lowest reflector. The distances from the transducer to each of the submerged reflectors, of course, are also known. Assuming that the lower liquid is water and the upper liquid is gasoline, the counts per inch in the gasoline can be expressed as $$Cg = \frac{(CR2 - CR1)}{(DR2 - DR1)}$$

where
CR1=count value for echo from lowest reflector
CR2=count value for echo from second lowest reflector
DR1=distance from transducer to lowest reflector
DR2=distance from transducer to second lowest reflector The counts per inch in the region between the transducer and the lowest reflector can be expressed as $$Cm = \frac{CR1}{DR1}$$

Using the known values of the velocity of sound in water and the temperature of the water, and since the echo count represents two-way travel time of the acoustic signal, the value representing the number of counts attributable to the two-way travel time of the acoustic signal through one inch of water at the current temperature may be calculated and expressed as Cw. The level of the water/fuel interface may then be expressed as $$Lw = DR1 \frac{Cg - Cm}{Cg - Cw}$$

It will be readily appreciated that the counts variation method described above does not rely on detecting a reflection from a liquid/liquid interface. Thus, it may be used when the level of the second liquid is very near the surface of the transducer. However, the velocity of sound in each liquid must be different at the temperatures under consideration.

From the foregoing, it will be appreciated that the methods and apparatus of the invention may be used to accurately determine the volume of liquid in a container and determine net volume compensated for temperature without actually measuring the temperature of the liquid in the container. Furthermore, the actual volume of each of two immiscible liquids can also be determined. The apparatus may thus be used to measure very low leak rates by measuring net volume changes with time.

Since the acoustic signal from the transducer used for locating the surface of the liquid is confined to a channel which has no reflectors, detection of a signal reflected from the surface is readily obtained. Isolation of the signal in a vertical channel essentially eliminates extraneous echoes and random noise. Similarly, by confining the signal from the second transducer 22 to an isolated channel, reflections from each reflector can be readily identified. Furthermore, since the distance to each reflector is known and the approximate velocity of the signal through the liquid is known, the signal sensing circuitry can be designed to be activated at predetermined time windows corresponding with estimated time required for a signal return from each reflector, thus further improving signal detection selectivity. By appropriate automatic recycling of the pulsing sequence, statistical averaging can be employed to produce extremely accurate distance measurements.

It will be appreciated that the system described can be programmed to accomplish a wide variety of tasks based on volumetric determinations. For example, leak tests can be performed by making precise net volume measurements at various intervals during a period when additional liquid is neither added nor withdrawn from the storage tank. Similarly, the volume monitoring system described can be used for automatic inventory control, automatic ordering, etc., by proper programming of the computer.

While the invention has been described with reference to monitoring liquid volumes in a storage tank, it will be appreciated that the principles thereof may be applied to similar monitoring applications by appropriate selection of operating components and conditions. It is to be understood, therefore, that although the invention has been described with particular reference to specific embodiments thereof, the forms of the invention shown and described in detail are to be taken as preferred embodiments of the same, and that various changes and modifications may be resorted to without departing from the spirit and scope of the invention as defined by the appended claims.

What is claimed:

1. Apparatus for determining the distance between the surface of a liquid and a known reference level below the surface of the liquid comprising:
   (a) an elongated body defining first and second linearly elongated parallel chambers with means substantially separating the interior of each chamber from the interior of the other chamber, each chamber having an upper end and a lower end;
   (b) an acoustic transducer adapted to emit acoustic signals and receive reflected acoustic signals mounted at the lower end of each of said chambers; and
   (c) a plurality of horizontally extending reflectors positioned at vertically spaced intervals within said second chamber.

2. Apparatus as defined in claim 1 wherein said elongated body is formed of fiberglass.

3. Apparatus as defined in claim 1 wherein said parallel chambers are in the form of cylinders.

4. Apparatus as defined in claim 1 including means for maintaining the liquid level within said parallel chambers equal to the liquid level outside said parallel chambers when said elongated body is positioned vertically and partially submerged in a liquid.

5. Apparatus as defined in claim 1 including means for suspending said elongated body substantially vertically within a liquid container with said acoustic transducers positioned at a known reference level within said container.

6. The method of determining the distance between the surface of a liquid and a known reference level below the surface of the liquid comprising the steps of:
   (a) positioning substantially vertically and partially submerged within said liquid a probe comprising an elongated body defining first and second separate linearly elongated parallel chambers, each chamber having an upper and a lower end; and acoustic transducer adapted to emit acoustic signals and receive reflected acoustic signals mounted at the lower end of each of said chambers; and a plurality of horizontally extending reflectors positioned at vertically spaced intervals within said second chamber so that the upper surfaces of said transducers are positioned at a known reference level and at least one of said reflectors is below the surface of said liquid;

(b) measuring the time required for an acoustic signal to travel from said transducer in said first chamber to the surface of said liquid;

(c) measuring the time required for an acoustic signal to travel from said transducer in said second chamber to at least one submerged reflector to determine the average velocity of said acoustic signal in said liquid; and (d) using said average velocity as determined in said second chamber and said time required for an acoustic signal to travel from the transducer in said first chamber to the surface of said liquid to determine the distance from the surface of the transducer to the surface of said liquid.

7. The method as set forth in claim 6 wherein at least two of said reflectors are submerged in said liquid and wherein said average velocity of said acoustic signal in said liquid is determined by using the time required for said acoustic signal to travel between two submerged reflectors.

8. The method of determining the distance between the surface of a liquid and a known reference level below the surface of said liquid comprising the steps of:

(a) measuring the time required for an acoustic signal to travel to the surface of the liquid from a first transducer located at a known reference level within a first chamber which is at least partially submerged in said liquid;

(b) measuring the time required for an acoustic signal from a second transducer within a second chamber adjacent and substantially isolated from said first chamber and at least partially submerged in said liquid to travel between two vertically spaced points separated by a known distance below the surface of said liquid within said second chamber;

(c) determining the velocity of said acoustic signal within said liquid from said time required for said acoustic signal to travel between said two points separated by a known distance; and (d) multiplying the time required for said acoustic signal to travel from said first transducer to said surface by the velocity of said acoustic signal within said liquid.

9. The method as set forth in claim 8 wherein said first transducer and said second transducer are positioned within linearly elongated parallel chambers extending vertically from said transducers to a level above the surface of said liquid.

10. The method of determining the volume of liquid in a container of known geometry comprising the steps of:

(a) measuring the time required for an acoustic signal to travel from a first transducer located within a substantially vertical first chamber and at a known position within a container to the surface of a liquid contained within said container;

(b) measuring the time required for an acoustic signal from a second transducer to travel within a second substantially vertical chamber in said container between two points below the surface of said liquid and separated by a known distance;

(c) determining the average velocity of said signal between said two points;

(d) multiplying said average velocity by the time required for said acoustic signal to travel from said transducer to said liquid surface to determine the height of said surface above said transducer; and (e) using the measured height of said liquid surface above said transducer and the known geometry of said container to determine the volume of said liquid in said container.

11. The method set forth in claim 10 including the further steps of:

(a) determining the average temperature of said liquid in said container; and (b) converting the volume of said liquid in said container to net volume of said liquid at a standardized temperature by multiplying said volume by a known net volume conversion factor.

12. The method set forth in claim 10 wherein the average velocity of said signal between said two points is determined by:

(a) measuring the time required for an acoustic signal to travel from said second transducer to a first reflector submerged in said liquid and positioned a first known distance above said second transducer;

(b) measuring the time required for an acoustic signal to travel from said second transducer to a second reflector submerged in said liquid and positioned a second known distance above said second transducer;

(c) subtracting the time required for said acoustic signal to travel said first known distance from the time required for said signal to travel said second known distance to determine the time required for said acoustic signal to travel from said first reflector to said second reflector; and (d) using the time required for said signal to travel from said first reflector to said second reflector to determine the average velocity of said acoustic signal in said liquid.

13. The method of determining the temperature of a liquid in a container comprising the steps of:

(a) measuring the velocity of an acoustic signal through a quantity of a known liquid at various known temperatures;

(b) determining a set of reference values of signal velocity vs. temperature for said liquid;

(c) measuring the time required for an acoustic signal to travel between two points separated by a known distance and submerged in a known liquid at an unknown temperature in a container; and (d) determining the velocity of said signal traveling between said two points; and (e) comparing the velocity of said signal traveling between said two points to said set of reference values to determine the temperature of the liquid between said two points.

14. The method of determining the volume of a liquid in a container of known geometry comprising the steps of:

(a) measuring the velocity of an acoustic signal through a quantity of liquid at various known temperatures;

(b) determining a set of reference values of signal velocity vs. temperature for said liquid;

(c) measuring the time required for an acoustic signal to travel from a transducer located at a known position within a container to the surface of a liquid contained within said container;

(d) measuring the time required for an acoustic signal to travel between two points separated by a known distance and submerged in said liquid;

(e) determining the average temperature between said two points by determining the velocity of said signal between said two points and comparing the velocity to said reference values;

(f) using the average temperature of the liquid between said two points to determine the average velocity of said signal between said transducer and said liquid surface;

(g) multiplying said average velocity by the time for said acoustic signal to travel from said transducer to said liquid surface to determine the height of said surface above said transducer; and (h) using the measured height of said liquid surface above said transducer and the known geometry of said container to determine the volume of said liquid in said container.

15. The method set forth in claim 14 including the further step of converting the volume of said liquid in said container to net volume of said liquid at a standardized temperature by multiplying said volume by a known net volume conversion factor.

16. The method set forth in claim 14 wherein the average velocity of said signal between said two points is determined by:

(a) measuring the time required for an acoustic signal to travel from a transducer submerged in said liquid in said container to a first reflector submerged in said liquid and positioned a first known distance above said transducer;

(b) measuring the time required for an acoustic signal to travel from said transducer to a second reflector submerged in said liquid and positioned a second known distance above said transducer;

(c) subtracting the time required for said acoustic signal to travel said first known distance from the time required for said signal to travel said second known distance to determine the time required for said acoustic signal to travel from said first reflector to said second reflector; and (d) using the time required for said signal to travel from said first reflector to said second reflector to determine the average velocity of said signal in said liquid.

17. The method of determining the distance of an interface between lower and upper liquids from a known reference level below said interface comprising the steps of:

(a) positioning an acoustic transducer capable of emitting acoustic signals and receiving reflected acoustic signals at said reference level;

(b) positioning a first reflector above said interface at a first known distance from said transducer;

(c) positioning a second reflector above said first reflector at a second known distance above said transducer and submerged in said upper liquid;

(d) measuring the time required for an acoustic signal to travel said first known distance;

(e) measuring the time required for an acoustic signal to travel said second known distance;

(f) determining the velocity of said signal between said first reflector and said second reflector;

(g) determining the velocity of said signal in said lower liquid;

(h) calculating the distance from said reference level to said interface using the formula $$Lw = DR1 \frac{Cg - Cm}{Cg - Cw}$$

where
Lw = distance from said reference level to said interface;
DR1 = said first known distance;
Cg = average velocity of said acoustic signal between said first reflector and said second reflector;
Cm = average velocity of said acoustic signal between said transducer and said first reflector; and
Cw = velocity of said acoustic signal in said first liquid.

* * * * *

UNITED STATES PATENT AND TRADEMARK OFFICE
CERTIFICATE OF CORRECTION

PATENT NO. : 5,095,748
DATED : March 17, 1992
INVENTOR(S) : Edward M. Gregory, et al.

It is certified that error appears in the above-identified patent and that said Letters Patent is hereby corrected as shown below:

Column 5, line 53, after "temperature" insert ---represents a close approximation of the average temperature---

Signed and Sealed this

First Day of June, 1993

Attest:

MICHAEL K. KIRK

*Attesting Officer*     Acting Commissioner of Patents and Trademarks